(12) United States Patent
Buckle

(10) Patent No.: US 7,001,439 B2
(45) Date of Patent: Feb. 21, 2006

(54) ZINC/AIR CELL ASSEMBLY

(75) Inventor: Keith Buckle, Southbury, CT (US)

(73) Assignee: The Gillette Company, Boston, MA (US)

( * ) Notice: Subject to any disclaimer, the term of this patent is extended or adjusted under 35 U.S.C. 154(b) by 359 days.

(21) Appl. No.: 10/405,330

(22) Filed: Apr. 2, 2003

(65) Prior Publication Data
US 2004/0197643 A1 Oct. 7, 2004

(51) Int. Cl.
*H01M 2/08* (2006.01)
*H01M 10/04* (2006.01)

(52) U.S. Cl. ........................ 29/623.2; 427/174
(58) Field of Classification Search ........... 29/623.1, 29/623.2; 429/174
See application file for complete search history.

(56) References Cited

U.S. PATENT DOCUMENTS

| | | | |
|---|---|---|---|
| 3,897,265 A | 7/1975 | Jaggard | 429/35 |
| 4,041,211 A | 8/1977 | Wiacek | 429/36 |
| 4,238,555 A | 12/1980 | Uetani et al. | 429/163 |
| 4,369,568 A * | 1/1983 | Dopp | 29/623.2 |
| RE31,413 E | 10/1983 | Jaggard | 429/27 |
| 4,585,710 A | 4/1986 | McEvoy | 429/27 |
| 5,279,905 A | 1/1994 | Mansfield et al. | 429/27 |
| 5,582,930 A | 12/1996 | Oltman et al. | 429/27 |
| 5,658,356 A | 8/1997 | Burns | 29/623.2 |
| 5,662,717 A * | 9/1997 | Burns | 29/623.1 |
| 6,436,156 B1 | 8/2002 | Wandeloski et al. | 29/623.2 |
| 6,551,742 B1 * | 4/2003 | Huq et al. | 29/623.1 X |
| 2001/0055715 A1 * | 12/2001 | Bennett et al. | 429/174 |

FOREIGN PATENT DOCUMENTS

| | | |
|---|---|---|
| JP | 58-30065 | 2/1983 |
| JP | 58-220369 | 12/1983 |

* cited by examiner

*Primary Examiner*—Stephen J. Kalafut
(74) *Attorney, Agent, or Firm*—Barry D. Josephs; Thomas G. Krivulka

(57) ABSTRACT

An assembly process for manufacture of zinc/air cells, typically zinc/air button cells. The cells have a cup shaped anode casing and cup shaped cathode casing, each having an open and closed end. The process comprises an assembly step wherein the two casings are pushed together, followed by a crimping step wherein the cell is punched through a die thereby crimping the cathode casing edge over the anode casing side wall with insulator seal therebetween. In each step, particularly in the crimping step, an anode punch having an annular protruding surface impacts the corner edge of the closed end of the anode casing while another punch is applied with an opposing force to the cathode casing. The process has particular utility for anode and cathode casings of small wall thickness, preferably between 2 and 5 mil (0.0508 and 0.127 mm).

24 Claims, 5 Drawing Sheets

ZINC/AIR CELL ASSEMBLY

FIELD OF THE INVENTION

The invention relates to a metal/air cell having an anode comprising zinc and an air cathode. The invention relates to a metal/air cell having an anode comprising zinc and an air cathode comprising manganese dioxide and processes for assembly of the cell.

BACKGROUND

Zinc/air depolarized cells are typically in the form of miniature button cells which have particular utility as batteries for electronic hearing aids including programmable type hearing aids. Such miniature cells typically have a disk-like cylindrical shape of diameter between about 4 and 12 mm and a height between about 2 and 6 mm. Zinc air cells can also be produced in somewhat larger sizes having a cylindrical casing of size comparable to conventional AAAA, AAA, AA, C and D size $Zn/MnO_2$ alkaline cells and even larger sizes.

The miniature zinc/air button cell typically comprises an anode casing (anode can), and a cathode casing (cathode can). The anode casing and cathode casing each have a closed end an open end and integral side walls extending from the closed end to the open end. The anode casing is fitted with an insulating seal ring which tightly surrounds the anode casing side wall. After the necessary materials are inserted into the anode and cathode casings, the open end of the cathode casing is typically pushed over the open end of the anode casing during assembly so that a portion of the cathode casing side walls covers a portion of the anode casing side wall with insulating seal therebetween. The anode and cathode casing are then interlocked in a second step by crimping the edge of the cathode casing over the insulator seal and anode casing.

The anode casing can be filled with a mixture comprising particulate zinc. Typically, the zinc mixture contains mercury and a gelling agent and becomes gelled when electrolyte is added to the mixture. The electrolyte is usually an aqueous solution of potassium hydroxide, however, other aqueous alkaline electrolytes can be used. The closed end of the cathode casing (when the casing is held in vertical position with the closed end on top) typically has a raised portion near its center. This raised portion forms the positive terminal and typically contains a plurality of air holes therethrough. The cathode casing closed end also typically has an annular recessed step which surrounds the positive terminal.

The cathode casing contains an air diffuser (air filter) which lines the inside surface of the raised portion (positive terminal contact area) at the casing's closed end. The air diffuser can be selected from a variety of air permeable materials including paper and porous polymeric material. The air diffuser is placed adjacent air holes in the raised portion of the casing closed end. Catalytic material typically comprising a mixture of particulate manganese dioxide, carbon and hydrophobic binder can be compacted into a disk shape forming a cathode disk within a cathode assembly. The cathode assembly with cathode disk therein can then be inserted into the cathode casing over the air diffuser on the side of the air diffuser not contacting the air holes. Typically a cathode assembly is formed by laminating a layer of electrolyte barrier material (hydrophobic air permeable film), preferably Teflon (tetrafluoroethylene), to one side of the catalytic cathode disk and an electrolyte permeable (ion permeable) separator material to the opposite side of the catalytic cathode disk. The cathode assembly with cathode disk therein is then typically inserted into the cathode casing so that its central portion covers the air filter and a portion of the electrolyte barrier layer rests against the inside surface of the step. The cathode disk in the final cell contacts the cathode casing walls.

If the cell is not adequately sealed, electrolyte can migrate to the edge of the catalytic cathode assembly and leakage of electrolyte from the cathode casing can occur. The leakage, if occurring, tends to occur along the peripheral edge of the cathode catalytic assembly and the cathode casing and then gradually seep from the cell through the air holes at the cathode casing closed end. The potential for leakage is greater when the anode casing and cathode casing is of very thin wall thickness, for example, between about 2 and 5 mil (0.0508 and 0.127 mm). Such low wall thickness is desirable, since it results in greater internal cell volume. However, there is a greater tendency for very thin walled cathode casing to relax or "spring back" after the cell is closed by crimping. Such relaxation can result in the development or enlargement of microscopic pathways between the cathode catalytic assembly and the inside surface of the cathode casing, in turn providing a pathway for electrolyte leakage.

The cathode casing can typically be of nickel plated cold rolled steel or nickel clad stainless steel with the nickel layer preferably on both inner and outer surfaces of the cold rolled or stainless steel. The anode casing can also be of nickel plated stainless steel, typically with the nickel plate forming the casing's outside surface. The anode casing can be of a triclad material composed of stainless steel having an outer layer of nickel and an inner layer of copper. In such embodiment the nickel layer typically forms the anode casing's outside surface and the copper layer forms the anode casing's inside surface. The copper inside layer is desirable in that it provides a highly conductive pathway between the zinc particles and the cell's negative terminal at the closed end of the anode casing. An electrical insulator seal ring of a durable, polymeric material can be inserted over the outside surface of the anode casing side wall. The insulator ring is typically of high density polyethylene, polypropylene or nylon which resists flow (cold flow) when squeezed and also resists chemical attack by alkaline electrolyte.

After the cell is assembled a removable tab is placed over the air holes on the surface of the cathode casing. Before use, the tab is removed to expose the air holes allowing air to ingress and activate the cell.

With more conventional anode and casing wall thicknesses which are greater than about 6 mil (0.152 mm), for example, between about 6 and 20 mil (0.152 mm and 0.508 mm), typically between about 6 and 10 mil (0.152 and 0.254 mm), the outside diameter of the anode casing with insulator seal thereon is typically less than the inside diameter of the cathode casing. (Such dimensions are as measured prior to pushing the cathode casing over the anode casing during assembly). In such case there will actually be some free space (zero interference) between the outside surface of the insulator seal and the inside surface of cathode casing wall when the anode casing and cathode casing are pushed together during the assembly step (prior to crimping). This is demonstrated, for instance, in U.S. Pat. No. 3,897,265 (Jaggard), Example at col. 6, lines 59–68. In the Jaggard Example the cathode casing had a wall thickness of 0.020 inches. The inside diameter of the cathode casing was 0.440 inches. The outside diameter of the anode casing was 0.410 inches. The insulator seal had a thickness of 0.010 inches.

Thus, the outside diameter of the anode casing with seal thereon was 0.430 inches, which is less than the inside diameter of the cathode casing of 0.440 inches, after the anode and cathode casing were pushed together (pre crimp).

It has been conventional to assemble the anode and cathode together in two steps a) assembly and b) crimping. In the assembly step the cathode casing is pushed over the anode casing without any reduction occurring in the cell diameter. In the crimping step the assembled cell is passed through a crimping die wherein the overall cell diameter is typically reduced slightly and simultaneously therewith the edge of the cathode casing wall is crimped over the insulator seal and anode casing to provide a tightly sealed cell.

There has been effort more recently to reduce the wall thickness of the anode and cathode casing for zinc/air button cells. Such wall thicknesses can be reduced to values below the more conventional 6 mil (0.152 mm) to 20 mil (0.508 mm) level. For example, in U.S. Pat. No. 5,582,930 (Oltman) zinc air button cells having anode casing wall thicknesses between about 0.114 and 0.145 mm (4.49 and 5.71 mil) and cathode casing wall thicknesses between about 0.114 and 0.155 mm (4.49 and 6.10 mil) are recited (col. 4, lines 26–33). In U.S. Pat. No. 6,436,156 (Wandeloski) zinc/air button cell anode and cathode casing wall thicknesses between about 1 and 15 mil (0.0254 mm and 0.381 mm) are recited. Thus, anode and cathode casings as low as even about 1 mil (0.0254 mm) were being contemplated.

Zinc/air button cells having anode and cathode casing of reduced wall thickness are desirable, since more internal volume becomes available for active material, thereby extending the cell's service life. However, there are greater challenges in providing a tight, durable seal for such zinc/air button cells having small casing wall thicknesses, for example, between about 2 and 5 mil (0.0508 and 0.127 mm) than in cells with more conventional casing wall thicknesses, for example between about 6 and 20 mil (0.152 and 0.508 mm) and higher.

One difficulty in designing a tight, durable seal of such zinc/air button cells having anode and cathode casings of small wall thicknesses, for example, between about 2 and 5 mil (0.0508 and 0.127 mm), desirably between about 2 and 4 mil (0.0508 and 0.102 mm) is the tendency of the cathode casing side walls to relax or spring back after the cell has been assembled and the cathode casing edge has been crimped over the insulator seal wall and anode casing. Such spring back effect tends to cause a loosening in the seal interface between anode and cathode casing, thereby providing a pathway for the alkaline electrolyte to leak from the cell.

Another challenge in assembling the zinc/air cell, for example, in pushing the cathode casing over the anode casing in the assembly step (before crimping), is that the thin casing walls can become easily distorted if the assembly is not done very carefully. For example, in the conventional assembly step it has been the practice to apply a flat punch which pushes against the flat central portion of the closed end of the anode casing while another punch pushes in opposite direction on the cathode casing. This is illustrated, for example, in U.S. Pat. No. 5,658,356 (Burns) wherein flat punch 48 is shown to have a flat surface which impacts flush against the closed flat end 52 of anode can 54 while another punch 46 pushes against the closed end 22 of cathode can 20. Also in the crimping step (following assembly) it has been the practice to apply a flat punch flush against the flat closed end of the anode can while another punch pushes in opposite direction against the closed end of the cathode can. This is illustrated, for example, in U.S. Pat. No. 3,897,265 (Jaggard) which shows at FIGS. 9 and 9a that a punch 90 having a flat surface 92 impacts against the closed end of the anode casing of cell 10 with a force F2 while another punch 82 presses down on the closed end of the cathode casing with an opposing greater force F1. This results in cell size reduction and crimping of the cathode casing as the cell is pushed through die cavity 81. While such assembly and crimping technique may be suitable when applied to conventional anode and cathode casing, for example, having wall thicknesses between about 6 and 20 mil (0.152 and 0.508 mm) it is unsuitable for assembly and crimping of anode and cathode casing of very small thickness for example, between about 2 and 5 mil, (0.0508 and 0.127 mm).

Specifically, when the conventional technique is applied to such small walled anode and cathode casings the flat punch against the flat central portion of the closed end of the anode casing tends to cause an inward deformation (inward concavity) of the closed end of the anode casing during the assembly step and in particular during the crimping step. Since the closed end of the anode casing also functions as the cell's negative terminal, such inward concavity of the anode casing closed end is undesirable because it is desirable to have this end of the cell flat in order to assure a close and uniform contact between said negative terminal and the device being powered. Also, any inward concavity of the anode casing closed end may reduce the cell's available internal volume for active material.

Another challenge associated with good design for thin walled zinc/air cells is to assure that close and consistent contact is established and maintained between the cathode disk and the inside surface of the cathode casing. This must be accomplished in view of the tendency of the cathode casing to relax and spring back after cell assembly and crimping. The "spring back effect" is more pronounced as above mentioned when the anode and cathode casing wall thicknesses are reduced to low levels, for example, between about 2 and 5 mil (0.0508 and 0.127 mm). The cathode disk is inserted into the cathode casing before the cathode casing is pushed over the anode casing. The cathode disk is inserted so that it abuts the closed end of the cathode casing with the peripheral edge of the disk facing the inside surface of the cathode casing. If the cathode disk is sized so that it is of the same or less diameter as the inside diameter of the cathode casing, the spring back effect may reduce the uniformity of contact between the cathode disk edge and the cathode casing. The spring back effect may also produce a pathway for leakage of electrolyte around the cathode disk edge. On the other hand if the cathode disk is designed so that it has a diameter very much greater than the inside diameter of the cathode casing, then distortion and surface rippling of the cathode disk may occur. This also can cause leakage of electrolyte from the interior of the cell.

It is desired to produce a zinc/air cell which stays tightly sealed after the cathode casing wall has been crimped over the anode casing with insulator material therebetween.

It is desired to produce a zinc/air cell which maintains close contact between the edge of the cathode disk and the inside surface of the cathode casing wall.

It is desired to produce a zinc/air cell which remains tightly sealed, thus reducing the chance of electrolyte leakage, though the anode casing and cathode casing have very small wall thicknesses, for example, between about 2 and 5 mil (0.0508 and 0.127 mm).

SUMMARY OF THE INVENTION

The invention is directed to zinc/air cells, particularly miniature zinc/air cell in the form of button cells, and to an improved assembly process for their manufacture.

An aspect of the invention is directed to an assembly process wherein the anode casing and cathode casing (anode can and cathode can) of a zinc/air cell are filled with active material and necessary internal components. The anode casing and cathode casing are each typically in the shape of a cup having closed end and opposing open end. In particular a cathode assembly containing a cathode disk therein is inserted into the cathode casing so that its circumferential edge faces the inside surface of the cathode casing side walls. A punch is applied to the cathode disk to press it towards the closed end of the cathode casing. This causes the cathode disk to expand radially resulting in a tight interference fit between the cathode disk and inside surface of the cathode casing side walls. The anode and cathode casings with all the cell components therein are then subjected to a) an assembly step wherein the anode casing and cathode casing are pushed together and b) a crimping step wherein the edge of the cathode casing is crimped over the side wall of the anode casing with insulator seal material therebetween. The closed end of the anode casing is desirably flat and functions as the cell's negative terminal. The closed end of the cathode casing is has a flat central portion with air holes therethrough. The flat central portion of the cathode casing closed end functions as the cell's positive terminal, and such flat central portion may typically be surrounded by a recessed annular step. The process of the invention has particular application to zinc/air cells having anode casing and cathode casing wall thicknesses between about 2.0 and 5 mils (0.0508 and 0.127 mm), desirably between about 2 and 4 mils (0.0508 and 0.102 mm), preferably between about 2.0 and 3.0 mil (0.0508 and 0.0762 mm). These wall thicknesses apply to the thickness of a single layer (unfolded) anode and cathode casing side wall and also the thickness of the closed end of the anode and cathode casing. In some embodiments, the anode casing side wall may be once folded in effect forming a double side wall. In such embodiment it will be appreciated that the above wall thickness ranges apply to each one of the double side walls.

Preferably, the filled anode casing and cathode casing are passed to a) an assembly step wherein they are pushed together essentially without causing any reduction in the overall cell diameter to form an intermediate cell and then b) punching the intermediate cell into a die cavity wherein the edge of the cathode casing is crimped over a slanted side portion of the anode casing with insulator seal material therebetween. The die cavity can have a slightly tapered conical shape so that the overall cell diameter is reduced slightly, for example, by at least about 5 mil (0.127 mm) as the cell is punched into said die cavity. In the assembly step the anode casing can be seated-in a support base-desirably-- having an annular edge protruding therefrom in contact with the corner edge of the closed end of the anode casing. Preferably, in such embodiment no portion of the support base contacts the flat central portion of the closed end of the anode casing. The cathode casing is aligned so that it is directly over the anode casing. In the assembly step an annular cathode casing punch can be applied against the recessed step of the closed end of the cathode casing while the corner edge of the closed end of the anode casing rests on the annular support base. In this case the force of the punch against the cathode casing causes the cathode casing to be pushed over the underlying anode casing side wall.

In an alternative assembly step, the support base for the anode casing may be an annular punch which impacts only a portion of the corner edge of the closed end of the anode casing. The cathode casing is preferably oriented so that it is directly over the anode casing. A downward force is applied to the cathode casing punch so that the cathode casing is forced downward while a smaller opposing upward force can be applied to the corner edge of the closed end of the anode casing. The anode and cathode casing are thereby pushed together without causing any inward concavity or deflection of the anode casing closed end.

After assembly the intermediate cell can be punched into a die cavity in order to crimp the edge of the cathode casing over a slanted portion of the anode casing with insulator seal therebetween. In accordance with the invention an annular cathode punch can be forced down against the annular step of the cathode casing while simultaneously therewith an annular punch can be forced up against the corner edge of the closed end of the anode casing. The downward force of the cathode casing punch is greater than the upward force of the anode casing punch so as to cause movement of the intermediate cell through the die cavity and bring about crimping. Preferably, the anode casing punch contacts and impacts only the corner edge of the anode casing. That is, in the crimping step it has been found desirable that no portion of the anode casing punch impact the flat central portion of the closed end of the anode casing. The result is a final zinc/air cell with which is crimped and tightly sealed without causing any inward concavity or deformity of the closed end of the anode casing.

In another aspect of the invention the zinc/air cell is preferably designed so there is an forced interference fit between outside of the anode casing with insulator seal thereon total (total diameter, (d1)) and the inside diameter of the cathode casing (d2). That is, the outside diameter of the anode casing plus insulator seal thereon is desirably greater than the inside diameter of the cathode casing, as measured before the cathode casing is pushed over the anode casing. Preferably the difference in these diameters (d1–d2) is desirably between about 0.5 and 4.5 mil (0.0127 and 0.114 mm), preferably between about 2 and 4.5 mil (0.0508 and 0.114 mm) for anode and cathode casing wall thicknesses between about 2 and 5 mil (0.0508 and 0.127 mm). The difference in these diameters (d1–d2) is desirably between about 0.5 and 4.5 mil (0.0127 and 0.114 mm), preferably between about 2 and 4.5 mil (0.0508 and 0.114 mm), desirably between about 1.5 and 2.5 mil (0.0381 and 0.0635 mm) for anode and cathode casing wall thicknesses between about 2.0 and 3.0 mil (0.0508 and 0.0762 mm). The wall thicknesses may be measured either before the cathode casing is pushed over the anode casing (FIG. 3) or after the cell is completed (FIG. 1). The forced interference fit (d1–d2) is desirably between about 0.5 and 3 mil (0.0127 and 0.0762 mm), preferably between about 1 and 3 mil (0.0254 and 0.0762 mm) for anode and cathode wall thicknesses between about 5 and 6 mil (0.127 and 0.152 mm). The forced interference fit (d1–d2) is desirably between about 2 and 4.5 mil (0.0508 and 0.114 mm) for anode and cathode casing wall thicknesses between about 2.0 and 3.0 mil (0.0508 and 0.0762 mm).

In another aspect with anode and cathode casings having small wall thicknesses between about 2 and 5 mil (0.0508 and 0.127 mm), desirably wall thickness between about 2 and 4 mils (0.0508 and 0.102 mm), preferably between about 2.0 and 3.0 mil (0.0508 and 0.0762 mm), it has been determined desirable to design the cathode disk such that the diameter of cathode disk is greater than the inside diameter of the cathode casing, as measured after the cathode assembly is inserted and punched into the cathode casing. In particular the outside diameter of the cathode disk (typically comprising manganese dioxide) forming a part of cathode assembly is desirably greater than the inside diameter of the cathode casing, as measured after the cathode assembly is inserted and punched into the cathode casing. Thus, after the cathode assembly is inserted and punched into the cathode casing there will be a forced interference fit between the edge of the cathode disk and the inside surface of cathode casing wall. This assures that there will be maintained close and consistent contact between the edge of the cathode disk and inside surface of the cathode casing, which in turn assures consistent performance of the cell when discharged. Such close and even contact will be maintained even though there is a tendency of the small walled cathode casing to relax and "spring back" after the crimping step.

The diameter of cathode assembly, particularly the diameter of cathode disk therein, is desirably between about 0.5 mil and 2.5 mil (0.0127 and 0.0635 mm), desirably between about 1 and 2.0 mil (0.0254 and 0.0508 mm), greater than the inside diameter of the cathode casing when the anode and cathode casing wall thicknesses are between about 2 and 5 mil (0.0508 and 0.127 mm). The diameter of cathode assembly, particularly the diameter of cathode disk therein, is desirably between about 1.0 and 1.5 mil (0.0254 and 0.0381 mm) greater than the inside diameter of the cathode casing when the anode and cathode casing wall thicknesses are between about 2 and 3 mil (0.0508 and 0.0762 mm). It will be appreciated that these differences in diameter are as measured after the cathode disk is inserted and punched into the cathode casing.

BRIEF DESCRIPTION OF THE DRAWINGS

The invention will be better understood with reference to the drawings in which.

DETAILED DESCRIPTION

Figure 1:
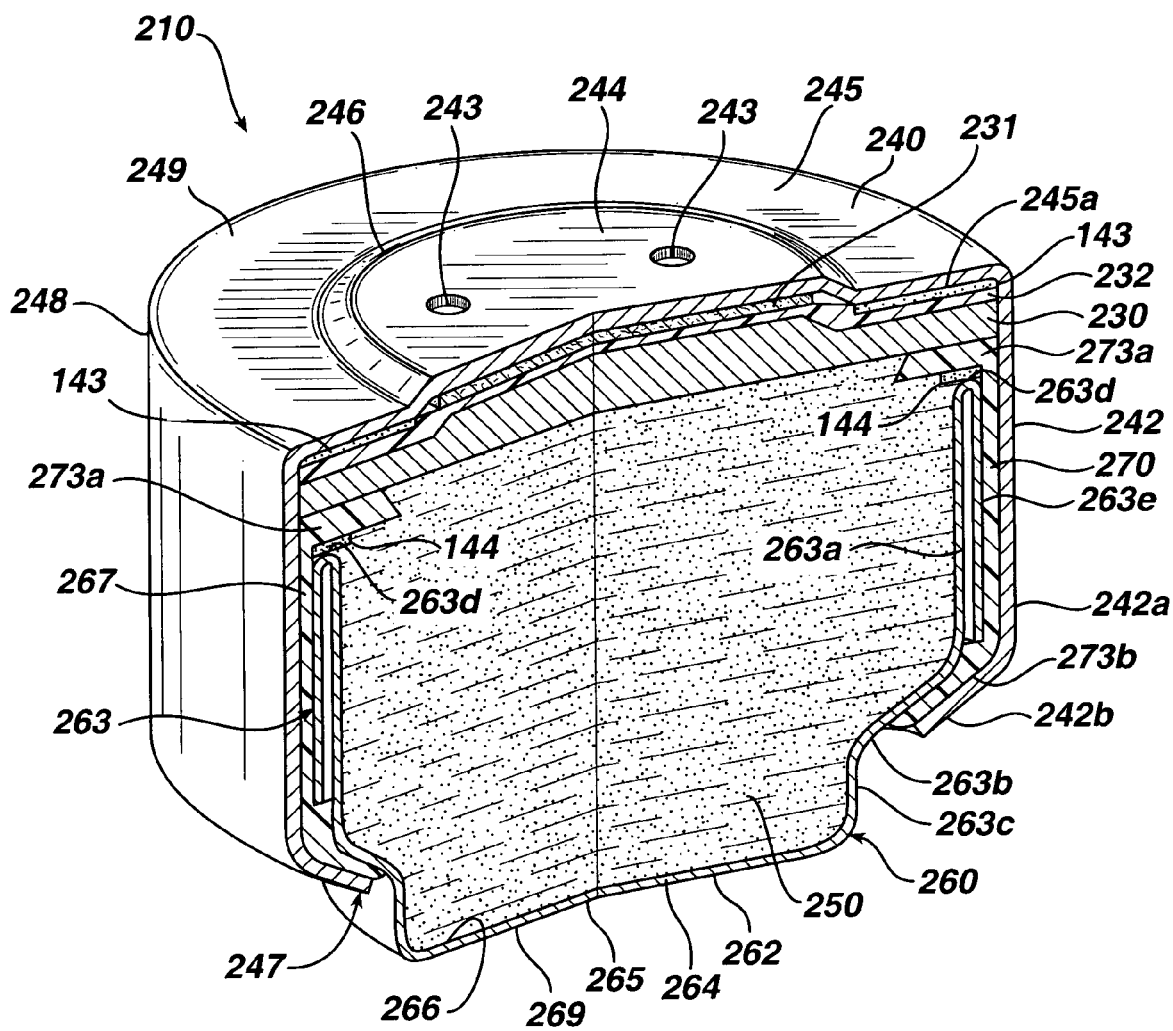
FIG. 1 is an isometric cross sectional view of an embodiment of the zinc/air cell of the invention.

The invention is directed to gas depolarized electrochemical cells. Such cells have a metal anode, typically comprising zinc and an air cathode. The cell is commonly referred to as a metal/air depolarized cell, and more typically a zinc/air cell.

The zinc/air cell of the invention is desirably in the form of a miniature button cell. It has particular application as a power source for electronic hearing aids. The miniature zinc/air button cell of the invention typically has a disk-like cylindrical shape of diameter between about 4 and 16 mm, preferably between about 4 and 12 mm and a height between about 2 and 9 mm, preferably between about 2 and 6 mm. The miniature zinc/air cell typically has an operating load voltage between about 1.2 volt to 0.2 volt. The cell typically has a substantially flat discharge voltage profile between about 1.1 and about 0.9 volt whereupon the voltage can then fall fairly abruptly to zero. The miniature button cell can be discharged at a rate usually between about 0.2 and 25 milliAmp. The term "miniature cells" or "miniature button cells" as used herein is intended to include such small size button cells, but is not intended to be restricted thereto, since other shapes and sizes for small zinc/air cells are possible. For example, zinc air cells could also be produced in somewhat larger sizes having a cylindrical casing of size comparable to conventional AAAA, AAA, AA, C and D size $Zn/MnO_2$ alkaline cells, and even larger.

The cell of the invention can contain added mercury, for example, about 3 percent by weight of the zinc in the anode or can be essentially mercury free (zero added mercury cell). In such zero added mercury cells there is no added mercury and the only mercury present is in trace amounts naturally occurring with the zinc. Accordingly, the cell of the invention can have a total mercury content less than about 100 parts per million parts by weight of zinc, preferably less than 40 parts per million parts (ppm) by weight of zinc, more preferably less than about 20 parts per million parts by weight of zinc. (The term "essentially mercury free" as used herein shall mean the cell has a mercury content less than about 100 parts per million parts by weight of zinc.) The cell of the invention can have a very small amount of lead additive in the anode. If lead is added to the anode, the lead content in the cell can typically be between about 100 and 600 ppm of zinc in the anode. However, the cell desirably does not contain added amounts of lead and thus can be essentially lead free, that is, the total lead content is less than 30 ppm, desirably less than 15 ppm of zinc in the anode.

The zinc/air cell 210 of the invention (FIG. 1) has an anode casing 260, a cathode casing 240 and electrical insulator material 270 therebetween. The anode casing 260 and cathode casing 240 are preferably each in the form of a can or cup having a closed end and opposing open end. The anode casing 260 has body 263 forming the side walls, an integral closed end 269, and an open end 267. The cathode casing 240 has a body 242, an integral closed end 249 and an open end 247. The closed end 249 of the cathode casing (when the casing is held in vertical position with the closed end on top) typically has a raised portion 244 near its center. This raised portion 244 forms the positive terminal contact area and typically contains a plurality of air holes 243 therethrough. The cathode casing closed end 249 also typically has an annular recessed step 245 which extends from the peripheral edge 246 of the raised terminal portion to the outer peripheral edge 248.

The anode casing 260 contains an anode mixture 250 comprising particulate zinc and alkaline electrolyte. The particulate zinc is desirably alloyed with between about 100 and 1000 ppm indium. The cathode casing 240 has a plurality of air holes 243 in the raised portion 244 of its surface at the closed end thereof. A cathode catalytic assembly 230 containing a catalytic composite material 234 (FIG. 2) is placed within the casing proximate to the air holes. The catalytic composite 234 comprises a catalytic cathode mixture 233 in the form of a disk coated on a screen 237. During cell discharge, the catalytic material 233 facilitates the electrochemical reaction with ambient oxygen as it ingresses through air holes 243. An adhesive sealant 143 is applied along a portion of the inside surface of cathode casing 240. In a preferred embodiment the adhesive can be applied as a continuous ring on the inside surface 245a of recessed annular step 245 at the closed end 249 of the casing as shown in FIG. 1 and as also described in U.S. Pat. No. 6,436,156

B1. If the closed end of the cathode casing is flat, that is, does not have a recessed step 245, the adhesive sealant 143 can be applied to the inside surface of the closed end 249 adjacent the outer peripheral edge 248 of said closed end. In such latter case the adhesive sealant 143 is desirably applied as a continuous ring to the inside surface of closed end 249 such that the continuous ring of adhesive 143 has an outside diameter of between about 75 percent and 100 percent, preferably between about 90 and 100 percent, more preferably between about 95 and 100 percent of the inside diameter of closed end 249.

Figure 2:
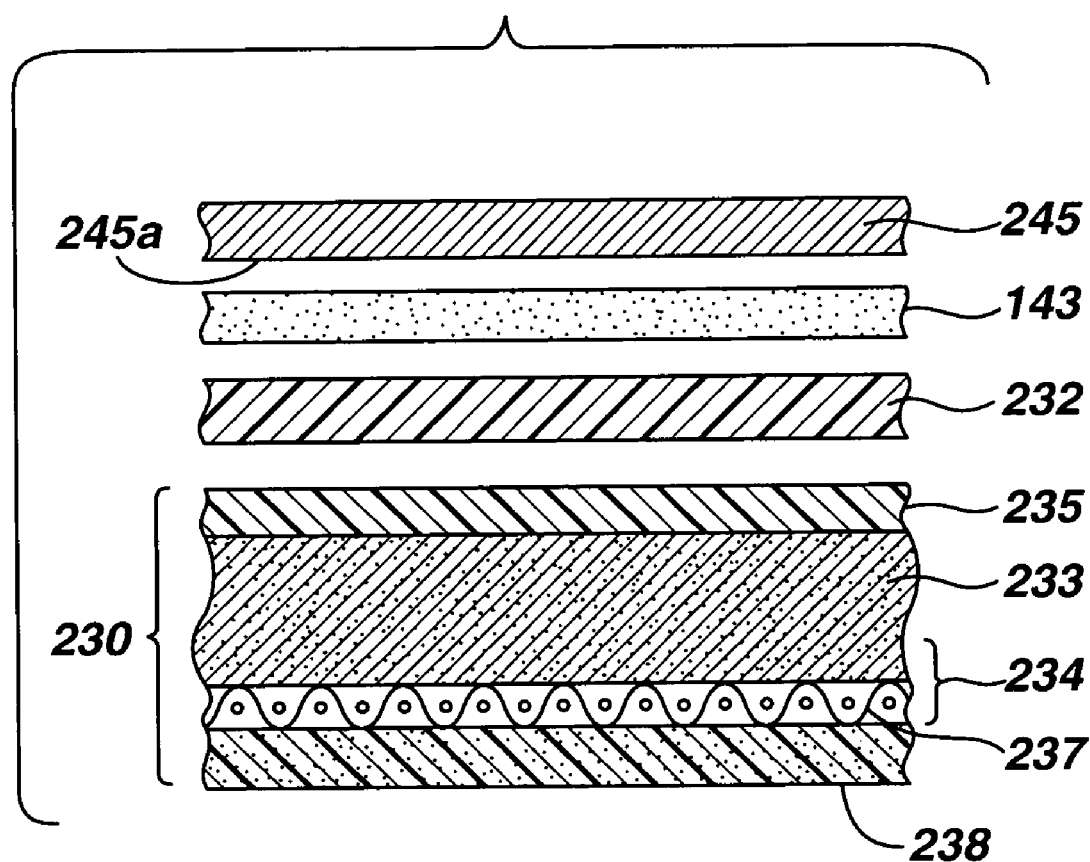
FIG. 2 is an exploded view of a preferred embodiment of the catalytic cathode assembly shown in FIG. 1.

A cathode catalytic assembly 230 (FIGS. 1 and 2) can be formed by laminating a layer of electrolyte barrier film material 235, preferably Teflon (tetrafluoroethylene), to one side of the catalytic composite material 234 and an ion permeable separator material 238 to the opposite side. The electrolyte barrier film 235, preferably of Teflon, has the property that it is permeable to air, yet keeps water and electrolyte from passing therethrough. The edge of cathode catalytic assembly 230 can be applied to said adhesive ring 143 on step 245 thereby providing a permanent adhesive seal between the cathode composite 234 and casing step 245. In a specific embodiment the cathode catalytic assembly 230 can be applied to adhesive 143 on step 245 with the electrolyte barrier 235 contacting the adhesive. In a preferred embodiment a separate electrolyte barrier sheet 232, preferably of Teflon, can be applied to adhesive ring 143 on the inside surface 245a of step 245, thereby bonding electrolyte barrier sheet 232 to the inside surface of step 245. The catalytic assembly 230 can then be applied over electrolyte barrier sheet 232, preferably with the surface of second electrolyte barrier sheet 235, preferably of Teflon, contacting the barrier sheet 232 (FIG. 2). The barrier sheet 232 when bonded to the inside surface 245a of step 245, particularly in combination with a second barrier sheet 235 (FIG. 2) being applied against barrier sheet 232, provides a very effective seal preventing electrolyte from migrating around the edge of catalytic assembly 230 and gradually leaking out of air holes 243. The use of adhesive sealant 143 also reduces the amount of crimping force needed during crimping the outer peripheral edge 242b over the anode casing body. This is particularly advantageous with thin walled anode and cathode casings 240 and 260 of wall thickness between about 0.001 inches (0.0254 mm) and 0.015 inches (0.38 mm), particularly with anode and cathode casing wall thicknesses between about 0.002 and 0.005 inches (0.0508 and 0.127 mm). The use of adhesive sealant 143 is also advantageous when thin catalytic cathode assemblies 230 are employed, since high crimping forces could possibly distort or crack such thin casings and cathode assemblies.

A preferred embodiment of a final zinc/air cell of the invention is shown in FIG. 1. The embodiment shown in FIG. 1 is in the form of a miniature button cell. The cell 210 comprises a cathode casing 240 (cathode can) an anode casing 260 (anode can) with an electrical insulator material 270 therebetween. The insulator 270 can desirably be in the form of a ring which can be inserted over the outside surface of the anode casing body 263 as shown in FIG. 1. Insulator ring 270 desirably has an enlarged portion 273a extending beyond peripheral edge 263d of anode casing 240 (FIG. 1). The insulator 270 with enlarged portion 273a prevents anode active material from contacting the cathode casing 240 after the cell is sealed. Insulator 270 is of a durable electrically insulating material such as high density polyethylene, polypropylene or nylon which resists flow (resists cold flow) when squeezed.

The anode casing 260 and cathode casing 240 are initially separate pieces. The anode casing 260 and cathode casing 240 are separately filled with active materials, whereupon the open end 267 of the anode casing 260 can be inserted into the open end 247 of cathode casing 240. The anode casing 260 can have a folded side wall formed of a first outer straight body portion 263e which extends vertically upwards (FIG. 1) forming the casing 260 outer side walls. The straight body portion 263e may desirably be folded over once at edge 263d to form a first downwardly extending inner portion 263a of the anode casing side wall. The folded portions 263a and 263e thus form a double side wall which together provide spring-like tension and additional support between the anode casing body 263 and abutting seal wall 270. This helps to maintain a tight seal between the anode and cathode casings. Alternatively, the side walls of the anode casing 240 can be formed as a single wall 263a without folded portion 263e. However, the anode casing 240 with the folded (double) side wall as shown in the figures herein has been determined to be desirable for very thin walled casing, for example, having a wall thicknesses between about 2 and 5 mil (0.0508 and 0.127 mm), 2 and 4 mils (0.0508 and 0.102 mm), preferably between about 2.0 and 3.0 mil (0.0508 and 0.0762 mm), which thickness ranges apply to each fold 263a and 263e. These thickness ranges also apply to the closed end 269 of the anode can. In the anode casing having a folded side wall (FIG. 1), the inner side wall portion 263a terminates in an inwardly slanted portion 263b which terminates in a second downwardly extending vertical portion 263c. The second straight portion 263c is of smaller diameter than straight portion 263a. The portion 263c terminates with a 90° bend forming the closed end 269 having a preferably flat negative terminal surface 265.

Figure 3:
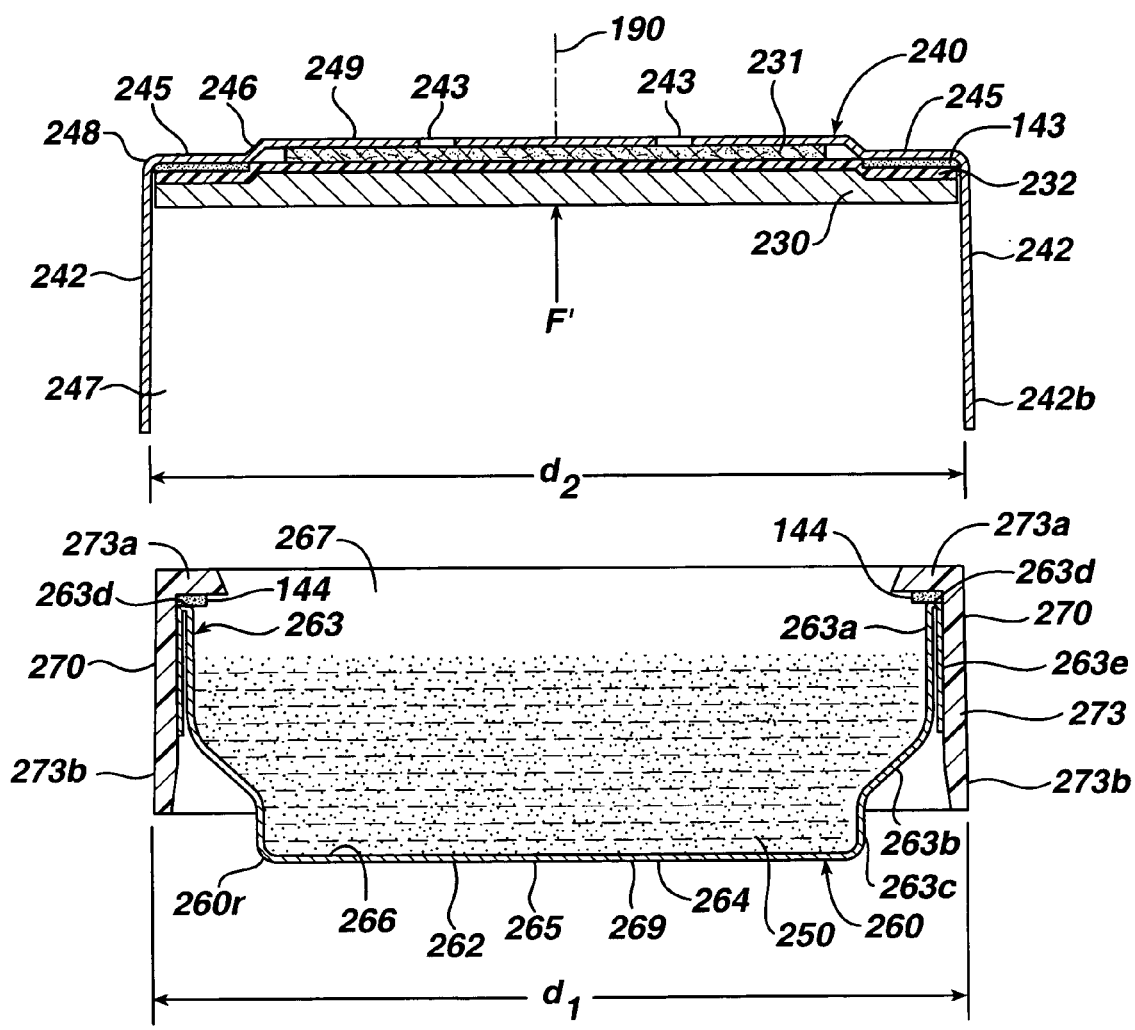
FIG. 3 is a cross sectional view of the anode and cathode casing of the cell prior to pushing the cathode casing over the anode casing.
Figure 4:
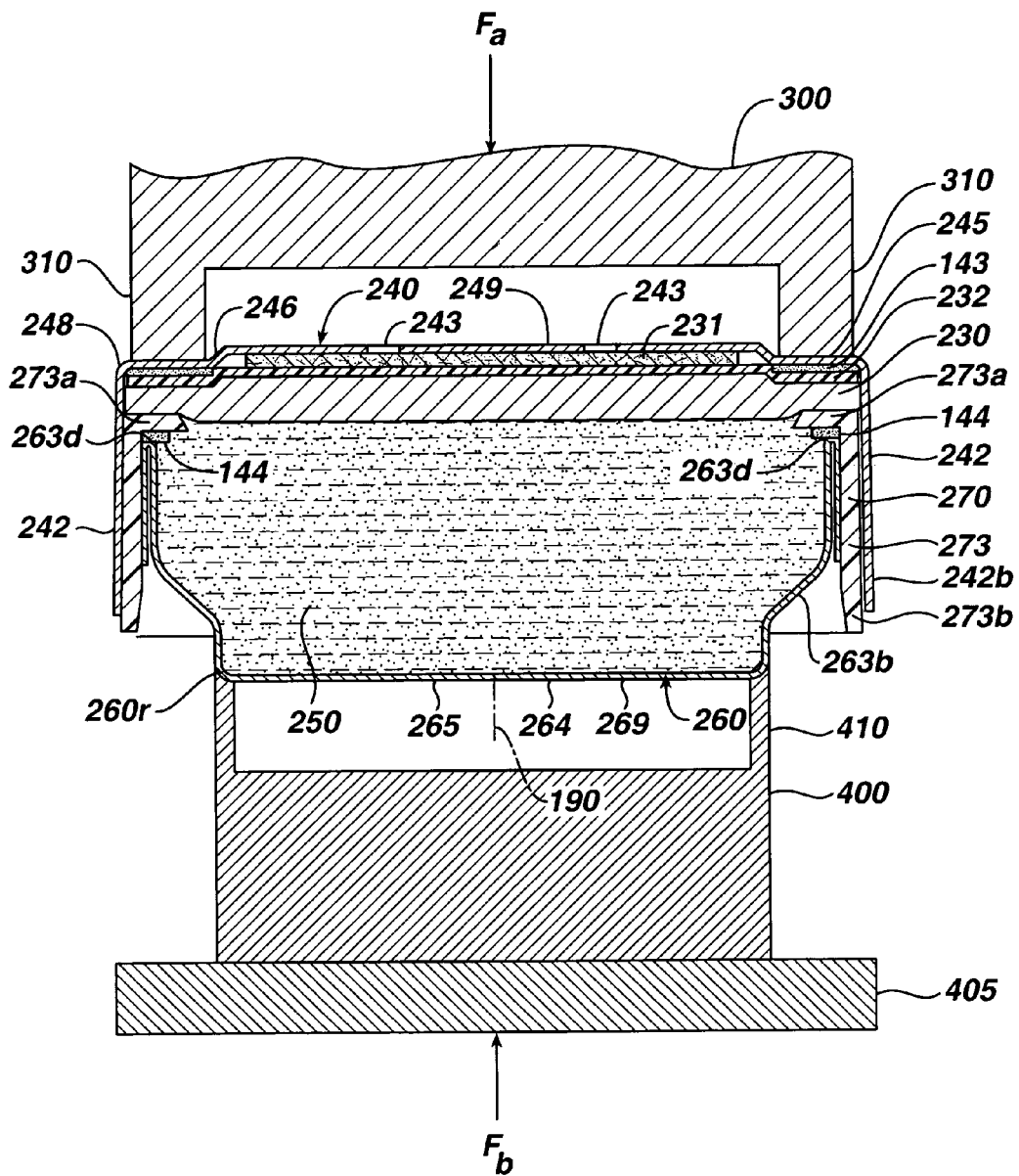
FIG. 4 is cross sectional view of the cathode casing being pushed over the anode casing in an assembly step.
Figure 5:
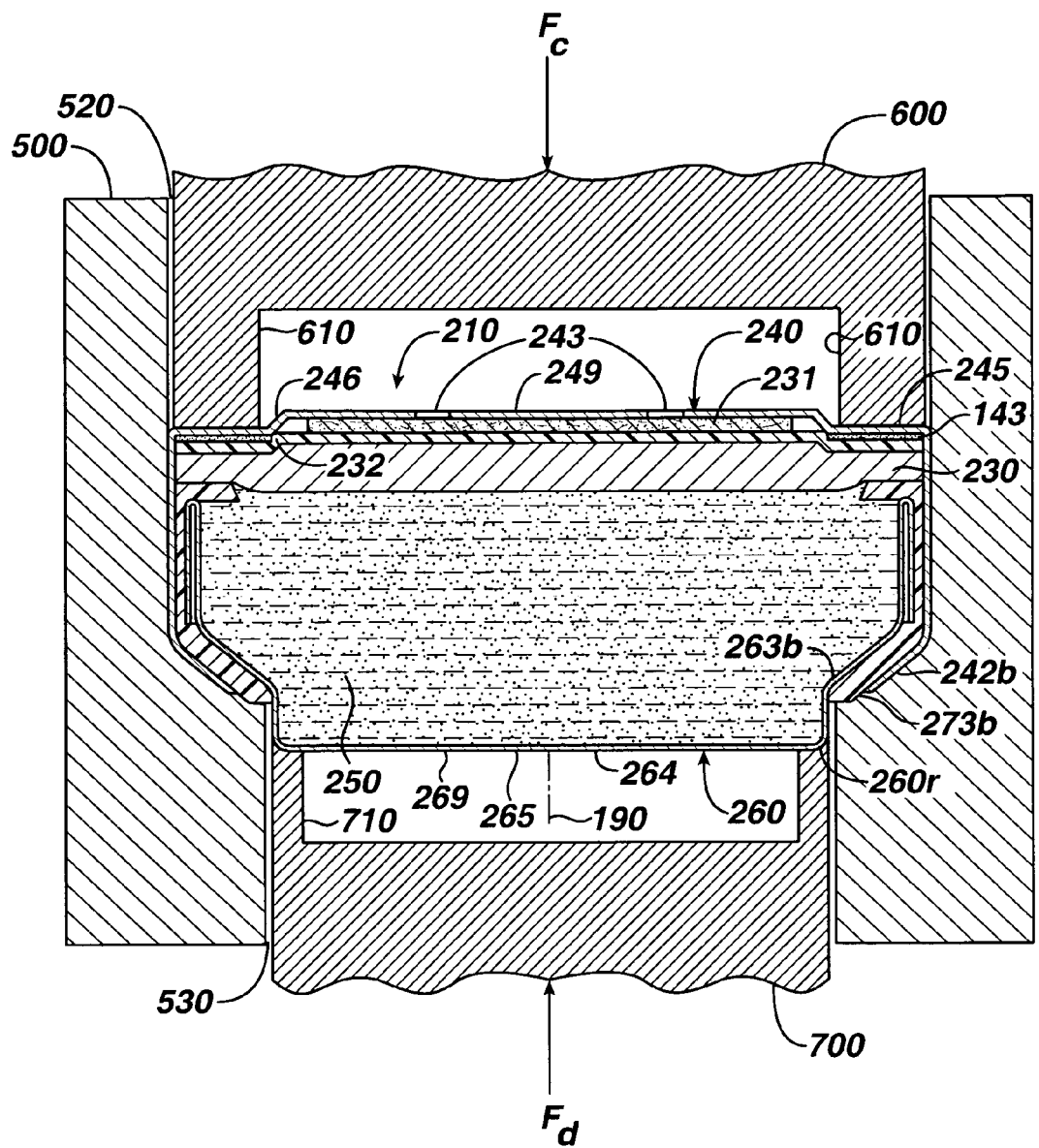
FIG. 5 is a cross sectional view of the cell being subjected to a crimping step by punching it into a die, wherein the cathode casing edge is crimped over the anode casing side wall with insulator seal therebetween.

The body 242 of cathode casing 240 has a straight portion 242a of maximum diameter extending vertically downwardly from closed end 249. The body 242 terminates in peripheral edge 242b. The peripheral edge 242b of cathode casing 240 and underlying peripheral edge 273b of insulator ring 270 are initially vertically straight as shown in FIGS. 3 and 4 and can be mechanically crimped over the slanted midportion 263b of the anode casing 260 as shown in FIG. 5. Such crimping locks the cathode casing 240 in place over the anode casing 260 and forms a tightly sealed cell.

Anode casing 260 can be separately filled with anode active material by first preparing a mixture of particulate zinc and powdered gellant material. The zinc average particle size is desirably between about 30 and 350 micron. The zinc can be pure zinc but is preferably in the form of particulate zinc alloyed with indium (100 to 1000 ppm). The zinc can also be in the form a particulate zinc alloyed with indium (100 to 1000 ppm) and lead (100 to 1000 ppm). Other alloys of zinc, for example, particulate zinc alloyed with indium (100 to 1000 ppm) and bismuth (100 to 1000 ppm) can also be used. These particulate zinc alloys are essentially comprised of pure zinc and have the electrochemical capacity essentially of pure zinc. Thus, the term "zinc" shall be understood to include such materials. The gellant material can be selected from a variety of known gellants which are substantially insoluble in alkaline electrolyte. Such gellants can, for example, be cross linked carboxymethyl cellulose (CMC); starch graft copolymers, for example in the form of hydrolyzed polyacrylonitrile grafted unto a starch backbone available under the designation Waterlock A221 (Grain Processing Corp.); cross linked polyacrylic acid polymer available under the trade designation Carbopol C940 (B.F. Goodrich); alkali saponified polyacrylonitrile available under the designation Waterlock A 400 (Grain Processing Corp.); and sodium salts of polyacrylic acids termed sodium polyacrylate superabsorbent polymer available under the designation Waterlock J-500 or J-550. A dry mixture of the particulate zinc and gellant powder can be formed with the gellant forming typically between about 0.1 and 1 percent by weight of the dry mixture. A solution of aqueous KOH electrolyte solution comprising between about 30 and 40 wt % KOH and about 2 wt % ZnO is added to the dry mixture and the formed wet anode mixture 250 can be inserted into the anode casing 260. Alternatively, the dry powder mix of particulate zinc and gellant can be first placed into the anode casing 260 and the electrolyte solution added to form the wet anode mixture 250.

A catalytic cathode assembly 230 (FIGS. 1 and 2) and air diffuser 231 can be inserted into casing 240 as follows: An air diffuser disk 231 (FIG. 1), which can be in the form of an air porous filter paper or porous polymeric material can be inserted into the cathode casing 240 so that it lies against the inside surface of the raised portion 244 of the casing against air holes 243. An adhesive sealant ring 143 is desirably applied to the inside surface 245a of recessed step 245 at the closed end of the cathode casing. A separate electrolyte barrier layer 232 (FIGS. 1 and 2), for example, of polytetrafluroethylene (Teflon) can optionally be inserted over the air diffuser 231 so that the edge of the barrier layer 232 contacts adhesive ring 143. Barrier layer 232 is permeable to air but not permeable to the alkaline electrolyte or water. The adhesive ring 143 thus permanently bonds the edge of barrier layer 232 to the inside surface of recessed step 245. The adhesive ring 143 with barrier layer 232 bonded thereto prevents electrolyte from migrating from the anode to and around cathode catalytic assembly 230 and then leaking from the cell through air holes 243. A catalytic cathode assembly 230 as shown in FIG. 2 can be prepared as a laminate comprising a layer of electrolyte barrier material 235, a cathode composite disk 234 under the barrier layer 235 and a layer of ion permeable separator material 238 under the catalyst composite 234, as shown in FIG. 2. The separator 238 can be selected from conventional ion permeable separator materials including cellophane, polyvinylchloride, acrylonitrile, and microporous polypropylene. Each of these layers can be separately prepared and laminated together by application of heat and pressure to form the catalytic assembly 230. The electrolyte barrier layer 235 can desirably be of polytetrafluroethylene (Teflon). The catalytic assembly 230 can then be applied over electrolyte barrier sheet 232 (FIG. 2), preferably with the surface of barrier (Teflon) sheet 235 contacting the barrier sheet 232.

Catalytic cathode composite 234 desirably comprises a catalytic cathode mixture 233 of particulate manganese dioxide, carbon, and hydrophobic binder which is applied by conventional coating methods to a surface of an electrically conductive screen 237, preferably a nickel mesh screen. The cathode mixture 233 is formed in the shape of a disk, which may be termed herein as the cathode disk. Other catalytic materials may be included or employed such as metals like silver, platinum, palladium, and ruthenium or other oxides of metals or manganese ($MnO_x$) and other components known to catalyze the oxygen reduction reaction. During application the catalytic mixture 233 is substantially absorbed into the porous mesh of screen 237. The manganese dioxide used in the catalytic mixture 233 can be conventional battery grade manganese dioxide, for example, electrolytic manganese dioxide (EMD). The manganese dioxide in catalytic mixture 233 can also be manganese dioxide formed from the thermal decomposition of manganese nitrate $Mn(NO_3)_2$. The carbon used in preparation of mixture 233 can be in various forms including graphite, carbon black and acetylene black. A preferred carbon is carbon black because of its high surface area. A suitable hydrophobic binder can be polytetrafluroethylene (Teflon). The catalytic mixture 233 may typically comprise between about 3 and 10 percent by weight $MnO_2$, 10 and 20 percent by weight carbon, and remainder binder. During cell discharge the catalytic mixture 233 acts primarily as a catalyst to facilitate the electrochemical reaction involving the incoming air. However, additional manganese dioxide can be added to the catalyst and the cell can be converted to an air assisted zinc/air or air assisted alkaline cell. In such cell, which can be in the form of a button cell, at least a portion of manganese dioxide becomes discharged, that is, some manganese is reduced during electrochemical discharge along with incoming oxygen. The adhesive ring 143 is intended to be applicable for use as well in such air assisted cells to prevent leakage of electrolyte therefrom.

In the preferred embodiment (FIG. 1) the anode casing 260 has a layer of copper 266 plated or clad on its inside surface so that in the assembled cell the zinc anode mix 250 contacts the copper layer. The copper plate is desired because it provides a highly conductive pathway for electrons passing from the anode 250 to the negative terminal 265 as the zinc is discharged. The anode casing 260 is desirably formed of stainless steel which is plated on the inside surface with a layer of copper. Preferably, anode casing 260 is formed of a triclad material composed of stainless steel 264 with a copper layer 266 on its inside surface and a nickel layer 262 on its outside surface as shown in FIG. 1. Thus, in the final assembled cell 210 (FIG. 1) the copper layer 266 forms the anode casing inside surface in contact with the zinc anode mix 250 and the nickel layer 262 forms the anode casing's outside surface. The copper layer 266 desirably has a thickness between about 0.0002 inches (0.005 mm) and 0.002 inches (0.05 mm). The nickel layer between about 0.0001 inches (0.00254 mm) and 0.001 inches (0.0254 mm).

By way of a specific non limiting example, the cell size could be a standard size 312 zinc/air cell having an outside diameter of between about 0.3025 and 0.3045 inches (7.68 and 7.73 mm) and a height of between about 0.1300 and 0.1384 inches (3.30 and 3.52 mm). The anode 250 can contain zero added mercury (mercury content can be less than 20 ppm of cell weight) and can have the following composition: zinc 77.8 wt % (the zinc can be alloyed with 200 to 500 ppm each of indium and lead), electrolyte (40 wt % KOH and 2 wt % ZnO) 21.9 wt. %, gelling agent (Waterlock J-550) 0.3 wt %, lead 400 ppm (0.04 wt %). The cathode catalyst composite 237 can have the following composition: $MnO_2$ 4.6 wt. %, carbon black 15.3 wt %, Teflon binder 18.8 wt. %, and nickel mesh screen, 61.2 wt. %. The total cathode catalyst composite 237 can be 0.140 g. The anode 250 can contain zero added mercury (mercury content can be less than 20 ppm of cell weight) and can have the following composition: zinc 77.8 wt % (the zinc can be alloyed with 200 to 500 ppm each of indium and lead), electrolyte (40 wt % KOH and 2 wt % ZnO) 21.9 wt. %, gelling agent (Waterlock J-550) 0.3 wt %, lead 400 ppm (0.04 wt %). Sufficient anode material 250 is supplied to fill the internal volume of anode casing 260. The adhesive sealant 143 can be applied as a continuous ring to the inside surface of the cathode casing recessed step 245.

The adhesive 143 to be applied to the inside surface 245a of step 245 can be a solvent based mixture comprising a polyacrylamide based adhesive component as described in U.S. patent No. 6,436,156 B1 and incorporated herein by reference. The adhesive component is thus desirably a low molecular weight thermoplastic polyamide resin. A preferred polyamide resin is available under the trade designation REAMID-100 or VERSAMID-100 (from Henkel Corp. or Cognis Corp.). REAMTD-100 or Versamid-100 is a low molecular weight polyamide which is a gel at room temperature. It is as a dimerized fatty acid with a molecular weight of about 390 and is the reaction product of a dimerized fatty acid and diamine. It has a molasses consistency and viscosity of between about 30 and 50 poise at room temperature. The adhesive mixture is easily formed by dissolving the REAMID-100 polyamide in a solvent of isopropanol 50 parts by weight and toluene 50 parts by weight. Another suitable solvent for REAMID-100 can be a mixture of isopropanol 40 parts by weight, toluene 40 parts by weight and butanol 20 parts by weight. Adhesive mixture comprising REAMID-100 and suitable solvent blended to achieve the desired mixture viscosity of about 1100 centipoise can be obtained from Specialty Chemicals Co. The polyamide based adhesive is desirable since it provides a very strong adhesive bond between materials such as Teflon and metal, e.g. between Teflon sheet and nickel plated steel at low adhesive thickness. Specifically the polyamide adhesive layer 143 applied to the inside surface 245a of cathode casing step 245 provides a very strong bond between Teflon sheet 232 and the nickel plated casing (step 245) at low adhesive thickness (e.g., 7 micron thickness after solvent evaporation). The polyamide based adhesive mixture also is desirable since it is resistant to chemical attack from the potassium hydroxide electrolyte. Although higher molecular weight polyamide based adhesive components can be used in the mixture it is desirable to use a lower molecular weight polyamide such as REAMID-100, since such lower molecular weight adhesive is more easily dissolved in the solvent. After the adhesive is applied to step 245 it dries quickly within about 1 to 3 seconds leaving behind a tacky adhesive ring of about 7 to 10 micron thickness on step 245. The adhesive dries quickly, within about 1 and 3 seconds.

Cell Assembly

Cell 210 can be assembled by first inserting the cathode components above described into the precrimped cathode casing 240 (FIG. 3). Air diffuser 231 is inserted against air holes 42 and an electrolyte barrier layer 232, preferably of Teflon, is placed over the air diffuser 231. Preferably the inside surface 245a of the cathode casing step 245 is coated with the above described adhesive 143 so that the edge of electrolyte barrier layer 232 adheres to the inside surface 245a of step 245. Preferably, the bottom surface (facing the cell interior) of the enlarged portion 273a of the insulating sealing disk 270 is coated with an adhesive 144 as shown in FIG. 3. Adhesive 144 may have the same composition as adhesive 143. Although the adhesive layers 143 and 144 can be omitted, it is desirably included, particularly for cells having anode and cathode casing wall thickness which are very thin. For example adhesive layers 143 and 144 is desirably included for cells 210 having anode and cathode casing wall thicknesses between about 2.0 and 5 mils (0.0508 and 0.127 mm), desirably between about 2 and 4 mils (0.0508 and 0.102 mm), preferably between about 2.0 and 3.0 mil (0.0508 and 0.0762 mm). Cathode assembly 230 (FIG. 2) is inserted over electrolyte electrolyte barrier layer 232.

The side walls 242 of the cathode casing 240 are tapered slightly outwardly towards edge 242b by an angle of between about 3 and 6 degrees from vertical when the cell is in upright positions with the cathode casing on top. The inside diameter d2 of cathode casing 240 is thus defined herein to be the mean diameter within the middle third portion of side walls 242. That is, the middle third portion of side walls 242 is located and the mean average inside diameter of the cathode casing within said middle third portion of said side walls is determined. By definition this is the average inside diameter d2 of cathode casing 240. The cathode disk 233 prior to insertion into casing 240 has a diameter which is slightly smaller (for example, less than about 1 mil (0.0254 mm) smaller) than the inside diameter d1 of the cathode casing 240 so that the cathode disk 233 can be inserted into cathode casing 240 without damaging the inside surface of side walls 242. The cathode assembly 230 including disk 233 is inserted into cathode casing 240 so that the cathode assembly 230 including cathode disk 233 abuts the closed end of cathode casing as shown in FIG. 3. A punch is then applied with a pressure of between about 50 and 60 psia (force F') against the exposed surface of cathode assembly 230 which compresses the cathode disk 233 thereby causing the cathode 233 disk diameter to expand radially. The average inside diameter d2 of the cathode casing is not altered. The diameter of the cathode casing, after it has been punched against the closed end of cathode casing 240 has a diameter which is greater than the average inside diameter d2 of cathode casing 240. The diameter of cathode disk 233 can be readily measured by peeling back cathode casing side walls 242 thereby exposing the edge of cathode disk 233 so that the diameter of said disk can be measured. The diameter of cathode disk 233 when so measured (after it has been punched against the closed end of cathode casing 240) is between about 0.5 mil and 2.5 mil (0.0127 mm and 0.0635 mm) greater than the average inside diameter d2 of cathode casing 240 when each of the anode casing 160 and cathode casing 240 has a wall thickness between about 2 and 5 mil (0.0508 and 0.127 mm). Desirably, the diameter of cathode disk 233 (as measured after it has been punched against the closed end of cathode casing 240) is between about 1.0 and 2.0 mil (0.0254 0.0508 mm) greater than the average inside diameter d2 of cathode casing 240 when each of said anode and cathode casings has a wall thickness between about 2 and 5 mil (0.0508 and 0.127 mm). More specifically, the cathode disk 233 (after it has been punched against the closed end of cathode casing 240) has a diameter which is preferably between about 1 and 1.5 mil (0.0254 and 0.0381 mm) greater than the inside diameter d2 of the cathode casing 240 when the anode casing 260 and cathode casing 240 each have a wall thickness of between about 2.0 and 3.0 mil (0.0508 and 0.0762 mm). The wall thicknesses may be measured either before the cathode casing is pushed over the anode casing (FIG. 3) or after the cell is completed (FIG. 1). Preferably the anode casing side wall 263 is folded as shown in FIG. 3. In such case each fold 263a and 263e has a wall thickness between about 2.0 and 3.0 mil (0.0508 and 0.0762 mm).

The anode casing 260 may be drawn to the shape shown in FIG. 3, for example, having straight side walls formed of an inner portion 263a which is folded over once to form outer portion 263e. Thus, in effect a double side wall is formed of inner wall 263a and outer wall 263e. An insulator seal ring 270 is applied over the anode casing side walls. The anode casing 260 is then filled with anode material 250 above described. In an assembly step the anode casing 260 may be seated onto a protruding annular surface 410 of an annular support 400 so that only the circumferential corner edge 260r contacts support 400 as shown in FIG. 4. Preferably the entire the corner edge 260r, which preferably has a convex surface, is in contact with the annular surface 410 of support 400. The annular contact surface 410 of punch 400 may have a concave surface which fits over convex surface 260r. However, annular contact surface 410 of punch 400 may be a slanted flat surface, for example, a flat surface slanted at an angle at between about 30 and 60 degrees, typically at 45 degrees, as measured from horizontal when the anode casing 260 is in vertical position as shown in FIG. 4.

Support 400 is designed with the annular edge 410 so that when the anode casing 260 is seated on support 400. The central portion of the closed end 269 of the anode casing does not contact support 400. The central portion of the closed end 269, unless otherwise specified, is defined herein as the portion of said closed end within at least one third the radius of said closed end extending from the center thereof. (The center of closed end 269 intersects with central longitudinal axis 190.) Alternatively, the central portion of the closed end 269 may be defined as the portion of said closed end within two thirds the radius of said closed end extending from the center thereof. Preferably, support 400 impacts only corner edge 260r of closed end 269 of anode casing 260 and thus does not impact the central portion of the closed end 269. Such support 400 has been determined to be desirable for anode casing having very thin walls, for example final wall thickness between about 2.0 and 5 mils (0.0508 and 0.127 mm), desirably between about 2 and 4 mils (0.0508 and 0.102 mm), preferably between about 2.0 and 3.0 mil (0.0508 and 0.0762 mm). In the case of a double (folded) side wall as shown in FIG. 1 it will be understood that the preceding ranges apply to each portion, namely inner wall 263a and outer wall 263e. These ranges apply as well to the anode casing closed end 269 and cathode casing closed end 249. The anode and cathode casings are aligned (FIG. 3) as they are passed along an assembly line in conventional manner. When so aligned a conventional annular punch 300 can be pressed against cathode casing step 245 with a force Fa so that the cathode casing side wall 242 is pushed over the edge of insulating seal 270 on the anode casing. Support 400 having a base portion 405 (FIG.4) can be stationary as the punch 300 is pressed against cathode casing step 245. However, support 400 can also be in the form of an annular punch which presses circumferentially onto the convex corner edge 260r with an upward force Fb as the cathode punch with annular edge 310 (FIG. 4) is pressed downwardly with a force Fa. In such case force Fa is preferably greater than force Fb. In such embodiment the annular punch 400 preferably does not impact the central portion of the closed end of the anode casing. The anode and cathode casing are thereby assembled together to form an intermediate cell 210 as shown in FIG. 4.

The intermediate cell 210 as shown in FIG. 4 is then passed to a crimping step (FIG. 5) wherein the cathode casing edge 242b and insulating seal edge 273b is crimped over cathode casing sloped side portion 263b to form the final crimped cell (FIG. 1). In the crimping step the assembled intermediate cell (FIG. 4) is punched into cavity 520 of die 500 (FIG. 5). Cavity 520 is defined by a slightly conical shaped inward sloping wall (not shown). In the crimping step (FIG. 5) an annular punch 600 having a protruding annular surface 610 is applied so that said annular surface 610 is pushed against cathode casing step 245. Preferably, simultaneously therewith an annular punch 700 is applied to the anode casing 260 so that the annular edge 710 of punch 700 pushes up against convex corner edge 260r of the anode casing with a force Fd while punch 600 pushes down on cathode casing 240 with a greater force Fc. There is a clearance cavity 530 between die 500 and anode punch 700 as shown in FIG. 5. The annular punch 700 preferably pushes against only the convex corner edge 260r of the anode casing and thus does not push against or even contact the central portion of closed end 269 of the anode casing 260. Punch 600 pushes down on the cathode casing 240 with a force Fc which is larger than the opposing force Fd pushing up on anode casing 260. As these opposing forces are applied the cell is forced down through die cavity 520 the cell diameter is reduced, typically at least about 5 mil (at least 0.127 mm), and the cathode casing edge 242b and seal edge 273b becomes crimped over cathode casing sloped wall portion 263b. This crimping step (FIG. 5) thereby results in a final cell with anode and cathode casing firmly interlocked with insulating seal 270 therebetween.

The crimping step employing an annular punch 700 which pushes against anode casing convex corner edge 260 is believed to be a novel feature of the process of the invention. The use of annular punch 700 is desirably employed with anode and cathode casings having thin wall. For example, annular punch 700 is desirably applied during the crimping step when the anode and cathode casing have wall thicknesses between about 2.0 and 5 mils (0.0508 and 0.127 mm), desirably between about 2 and 4 mils (0.0508 and 0.102 mm), preferably between about 2.0 and 3.0 mil (0.0508 and 0.0762 mm). In the case of a double (folded) anode casing side wall as shown in FIG. 1 it will be understood that the preceding ranges apply to each portion, namely inner wall 263a and outer wall 263e. These ranges apply as well to the anode casing closed end 269 and cathode casing closed end 249. Use of the annular punch 700 assures that the anode and cathode casing are crimped together without causing inward deflection of the central portion of the anode casing closed terminal end 269. (The central portion of the anode casing closed end is defined as any portion of the closed end within a radius of about ⅔ of the closed end radius, as measured from the center of said closed end.) That is, in the above described crimping process of the invention the anode casing terminal end 269 remains flat, which is very desirable from the standpoint of assuring good electrical contact between the negative terminal end 269 with the device, such as a hearing aid being powered. Also the flat terminal end 269 gives the cell an overall attractive appearance.

Forced Interference Fit

There are special problems associated with assembly of the cell when the anode and casing final wall thicknesses are intended to be very small, e.g. between about 2.0 and 5 mils (0.0508 and 0.127 mm) and particularly when such final wall thickness are between about 2 and 4 mils (0.0508 and 0.102 mm), preferably between about 2.0 and 3.0 mil (0.0508 and 0.0762 mm). These final wall thicknesses apply as well to the closed end 249 of the anode casing 260 and closed end 249 of the cathode casing 240. In the case of a double (folded) anode casing side wall as shown in FIG. 1 it will be understood that the preceding ranges apply to each portion, namely inner wall 263a and outer wall 263e. It is desirable that both anode and cathode casing wall thicknesses be within these ranges, however, it will be appreciated that the wall thicknesses of both anode and cathode casing do not have to be identical. It has been determined that with such small wall thicknesses there is a greater tendency of cathode casing side wall 242 to relax or spring back after the crimping step. Such relaxation or "spring back", if unchecked, tends to cause the interlock between the anode and cathode casing after crimping to relax somewhat with time. Such relaxation make the cell more prone to leakage of electrolyte through the relaxed interface between the cathode casing wall 242 and seal 270.

It has been determined that such relaxation or "spring back" effect can be mitigated by carefully designing the cell so that outside diameter of the anode casing 260 plus seal 270, namely diameter d1, is greater than the inside diameter d2 of the cathode casing 240 as shown in FIG. 3. It will be understood that the side wall 273 of insulating seal 270 may be tapered outwardly towards edge 273b by an angle of up to about 10degrees, preferably an angle between about 3 and 6 degrees when the anode casing 260 is in upright positions with the closed end on bottom as shown in FIG. 3. Thus, the outside diameter d1 comprising the diameter of the anode casing 260 plus insulating seal 270 thereon is defined herein as the mean average diameter within the middle third portion of the seal side wall 273. It will be noted that such dimensional relationship as shown in FIG. 3 is as measured prior to pushing the anode and cathode casing together in the assembly step (FIG. 4). Since diameter d1 is greater than diameter d2 there will be a forced interference fit between the inside wall surface of the cathode casing and the outside surface of seal 270 when the anode and cathode casings are pushed together. Thus, as used herein the term forced interference fit between cathode casing wall 242 and anode casing wall 263 with seal 270 attached thereto shall mean that prior to assembly (FIG. 3) the outside diameter of the anode casing 260 plus seal 270, namely diameter d1, is greater than the inside diameter d2 of the cathode casing 240. The diameter d1, although greater than diameter d2 in accordance with the invention (FIG. 3), must not be so much greater than diameter d2 so as to cause noticeable deformity (bulging) and weakening in the cathode casing 242 wall when the anode casing 260 and cathode casing 240 are pushed together during assembly (FIG. 4).

It has been determined that if the anode casing 260 with seal 270 is designed to have such forced interference fit (FIG. 3), then after the cell is assembled and crimped the finished cell 210 (FIG. 1) will maintain a tight seal and interlock between anode and cathode casing with seal 270 therebetween. Such interference design as described herein mitigates the tendency of the cathode casing to relax or spring back after crimping and thus reduces that the chance of electrolyte leakage from the cell. The chance of electrolyte leakage is considerably reduced even if the cell is exposed to extremes in ambient temperature, for example between about −10 and 120° F. (−23.3 and 49° C.).

Specifically, the forced interference fit between outside diameter of seal 270 and inside diameter of the cathode casing (d1−d2) as shown in FIG. 3 is desirably between about 0.5 and 4.5 mil (0.0127 and 0.114 mm), preferably between about 2 and 4.5 mil (0.0508 and 0.114 mm), desirably between about 1 and 3 mil (0.0254 and 0.0762 mm) for anode and cathode casing wall thicknesses each being between about 2 and 5 mil (0.0508 and 0.127 mm). Particularly, the difference in these diameters (d1−d2) is preferably between about 2.0 and 4.5 mil (0.0508 and 0.114 mm), desirably between about 1 and 3 mil (0.0254 and 0.0762 mm), for anode and cathode casing wall thicknesses each being between about 2.0 and 3.0 mil (0.0508 and 0.0762 mm). The forced interference fit (d1−d2) is desirably between about 0.5 and 3 mil (0.0127 and 0.0762 mm), preferably between about 1 and 3 mil (0.0254 and 0.0762 mm) for anode and cathode wall thicknesses between about 5 and 6 mil (0.127 and 0.152 mm). The forced interference fit (d1−d2) is desirably between about 2 and 4.5 mil (0.0508 and 0.114 mm) for anode and cathode casing wall thicknesses between about 2.0 and 3.0 mil (0.0508 and 0.0762 mm). The wall thicknesses may be measured either before the cathode casing is pushed over the anode casing (FIG. 3) or after the cell is completed (FIG. 1). These recited wall thicknesses apply to anode and cathode casings having a single wall. They also apply to anode casing having double (folded) anode casing side wall as shown in FIG. 1. In such case it will be understood that the preceding ranges apply to each portion, namely inner wall 263a and outer wall 263e.

Additionally, with anode and cathode casings each having small wall thicknesses between about 2 and 5 mil (0.0508 and 0.127 mm) desirably wall thickness between about 2 and 4 mils (0.0508 and 0.102 mm), preferably between about 2.0 and 3.0 mil (0.0508 and 0.0762 mm), it has been determined desirable to design the cathode disk 233 within cathode assembly 230 such that the diameter of the cathode disk 233 is greater than the inside diameter of the cathode casing 240 (FIGS. 2 and 3). As above described these measurements are taken after the cathode disk 233 has been inserted into cathode casing 240 and then punched against the closed end of said casing thereby radially expanding the cathode disk 233. The radial expansion provides a tight fit of the cathode disk 233 against the inside surface of cathode casing 240 so that when the cathode casing is inverted, the cathode disk 233 will not become dislodged. Since the cathode casing side walls 242 can be slightly slanted, the inside diameter d2 of the cathode casing is defined herein as the mean average diameter taken along the middle third of the cathode casing side wall 242. The wall thicknesses may be measured either after the cathode disk 233 is inserted and punched into the cathode casing 240 or after the cell is completed (FIG. 1). These ranges also apply to anode casing having double (folded) anode casing side wall as shown in FIG. 1. In such case it will be understood that the preceding ranges apply to each portion, namely inner wall 263a and outer wall 263e. In particular the outside diameter of the cathode disk 233 is greater than the inside diameter of the cathode casing 240, as measure after the cathode assembly 230 with cathode disk 233 therein is inserted and punched into the cathode casing 240. The punch may typically apply a pressure of between about 50 and 60 psi against the bottom surface of cathode assembly 230 resulting in a force F' against the botton surface of cathode assembly 230. This causes the cathode disk 233 to expand radially resulting in the above described interference fit between cathode casing outside diameter and the inside diameter of the cathode casing 240. Thus, when the cathode assembly 230 is inserted and punched into the cathode casing there will be a forced interference fit between the edge of the cathode assembly 230, particularly between the cathode disk 233 and the inside surface of the cathode casing 240. This will assure that there will be maintained close and even contact between the edge of the cathode disk 233 and inside surface of the cathode casing. Such close and even contact will be maintained even though there is a tendency of the cathode casing to relax and spring back as above mentioned after the crimping step (FIG. 5).

Specifically, it has been determined that after the cathode disk 233 has been inserted and punched into the cathode casing 240, the diameter of the cathode disk 233 should desirably be between about 0.5 mil and 2.5 mil (0.0127 and 0.0635 mm), preferably, between about 1 and 2 mil (0.0254 and 0.0508 mm), desirably between about 1 and 1.5 mil (0.0254 and 0.0381 mm) greater than the inside diameter (d2) of the cathode casing 240 when the cathode casing wall 242 has a thicknesses between about 2 and 5 mil (0.0508 and 0.127 mm). After cathode disk 233 has been inserted and pushed into cathode casing 240, the diameter of cathode disk 233 is desirably between about 1 mil and 1.5 mil (0.0254 and 0.0381 mm) greater than the inside diameter of the cathode casing when the cathode casing wall thickness is between about 2 and 3 mil (0.0508 and 0.0762 mm).

It will be appreciated that these differences in diameter are as measured after the cathode assembly 230 with cathode disk therein is inserted and punched into the cathode casing 240. A forced friction interference fit along the circumferential edge of the cathode disk 233 and cathode casing wall 242 thus develops after the cathode assembly 230 is inserted and punched into the cathode casing 240. Although the diameter of the cathode disk 233 is greater than the inside diameter of the cathode casing 240, the diameter of the cathode disk 233 should not be so much greater than the inside diameter of the cathode casing 240 as to cause noticeable deformity (bulging) and weakening in the cathode casing 242 wall when cathode disk 233 is inserted into the casing 240. The interference fit between cathode disk and cathode casing results in close and consistent contact between the edge of the cathode disk and inside surface of the cathode casing side walls.

The following are examples of a preferred zinc/air button cell made by the assembly method of the invention.

EXAMPLE 1

Anode and Cathode Casing Wall Thickness 4 mil (0.102 mm)

A zinc/air cell having overall dimensions approximately 8 mm diameter and 4 mm thick (Duracell 312 size) was fabricated according to the process of the invention. The anode casing 260 and cathode casing 240 of the completed cell had a small wall thickness of 4 mil (0.102 mm). The anode casing had a folded (double) side wall comprising an inner portion 263a and an outer portion 263e. Insulator seal 270 had a side wall thickness of 6.5 mil (0.165 mm). The cathode disk 233 had an overall diameter which was 2.0 mil (0.0508 mm) greater than the inside diameter (d2) of the cathode casing as measured after the cathode disk 233 was inserted and punched into the cathode casing. The outside diameter of the anode casing plus seal 270 (diameter d1) as shown in FIG. 3 was 3.5 mil (0.0889 mm) greater than the inside diameter (d2) of the cathode casing before the cathode casing 240 is pushed over the anode casing 260 with insulating seal 270 therebetween. The cell components including cathode disk 233 and anode 250 and remaining cell components were as described above, as referenced with respect to FIGS. 1 and 2. There was an adhesive layer 143, as above described, applied to the inside surface 245a of cathode casing step 245 and adhesive layer 144 applied to the bottom surface of enlarged portion 273a of insulating seal disk 270. The filled anode and cathode casings were then pushed together in the assembly step shown in FIG. 4 to from an intermediate cell. The intermediate cell was then punched into die cavity 520 and crimped in the crimping step shown and described with reference to FIG. 5. In both the assembly (FIG. 4) and crimping step (FIG. 5) an annular punch 400 and 500, respectively, was applied only against corner edge 260r of the closed end 269 of the anode casing while another punch 300 and 600 respectively was applied against the closed end 249 of cathode casing with a greater and opposing force.

The cell maintained excellent performance during its normal use as a hearing aid battery. There was not any noticeable electrolyte leakage from the cell occurring during storage or normal use.

EXAMPLE 2

Anode and Cathode Casing Wall Thickness 2.5 mil (0.0635 mm)

A zinc/air cell having overall dimensions approximately 8 mm diameter and 4 mm thick (Duracell 312 size) was fabricated according to the process of the invention. The anode casing 260 and cathode casing 240 of the completed cell had a small wall thickness of 2.5 mil (0.0.0635 mm). The anode casing had a folded (double) side wall comprising an inner portion 263a and an outer portion 263e. Insulator seal 270 had a side wall thickness of 4.0 mil (0.102 mm). The cathode disk 233 had an overall diameter which was 1.5 mil (0.0381 mm) greater than the inside diameter (d2) of the cathode casing as measured after the cathode disk 233 was inserted and punched into the cathode casing. The outside diameter of the anode casing plus seal 270 (diameter d1) as shown in FIG. 3 was 4.5 mil (0.114 mm) greater than the inside diameter (d2) of the cathode casing before the cathode casing 240 is pushed over anode casing 260 with insulating seal 270 therebetween. The cell components including cathode disk 233 and anode 250 and remaining cell components were as described above, as referenced with respect to FIGS. 1 and 2. There was an adhesive layer 143 as above described applied to the inside surface 245a of cathode casing step 245 and adhesive layer 144 applied to the bottom surface of enlarged portion 273a of insulating seal disk 270. After the cell components (FIGS. 1 and 2) were inserted into the anode and cathode casing anode and cathode casing (FIG. 3) were pushed together in the assembly step shown in FIG. 4 to form an intermediate cell. The intermediate cell was then punched into die cavity 520 and crimped in the crimping step shown and described with reference to FIG. 5. In both the assembly (FIG. 4) and crimping step (FIG. 5) an annular punch 400 and 500, respectively, was applied only against convex corner edge 260r of the closed end 269 of the anode casing while another punch 300 and 600 respectively was applied against the closed end of cathode casing with a greater and opposing force.

The cell maintained excellent performance during its normal use as a hearing aid battery. There was not any noticeable electrolyte leakage from the cell occurring during storage or normal use.

Although the invention has been described with reference to specific embodiments, it should be appreciated that other embodiments are possible without departing from the concept of the invention. Thus, the invention is not intended to be limited to the specific embodiments but rather its scope is reflected by the claims and equivalents thereof.

What is claimed is:

1. In a method of assembling an electrochemical cell having an anode can and a cathode can; wherein said cathode can has an open end and opposing closed end with integral side wall therebetween; wherein said anode can has an open end and opposing closed end and integral side wall therebetween; wherein the intersection of said anode can side wall and said anode can closed end forms an integral corner edge; wherein the cathode can is pushed onto the anode can so that the side wall of the cathode can overlaps at least a portion of the side wall of the anode can with an insulator seal material therebetween to form an intermediate cell, the improvement comprising:

punching said intermediate cell into a die cavity by exerting a force against a portion of the corner edge of the closed end of the anode can without contacting the central portion of said anode can closed end, and simultaneously therewith applying an opposing greater force against the closed end of the cathode can thereby forcing the cell into said die cavity; wherein the edge of the cathode can at the open end thereof is crimped over a portion of the anode can side wall with insulator seal material therebetween.

2. The method of claim 1 wherein the corner edge of the anode can has a convex surface and said force applied to said corner edge is applied to said convex surface without impacting the central portion of said closed end of the anode can.

3. The method of claim 1 wherein the cathode can side wall and anode can closed end each has a wall thickness between about 2.0 and 5 mils (0.0508 and 0.127 mm) after said crimping.

4. The method of claim 1 wherein the cathode can side wall and anode can closed end each has a wall thickness between about 2 and 4 mils (0.0508 and 0.102 mm) after said crimping.

5. The method of claim 1 wherein the cathode can side wall and anode can closed end each has a wall thickness between about 2.0 and 3.0 mil (0.0508 and 0.0762) after said crimping.

6. The method of claim 1 wherein the cell is a button cell having disk-like cylindrical shape having a diameter between about 4 and 16 mm and a height between about 2 and 9 mm.

7. The method of claim 1 wherein the cell is a zinc/air depolarized cell comprising anode material comprising zinc and alkaline electrolyte within the anode can, and a catalytic cathode material comprising manganese dioxide within the cathode can.

8. A method of assembling an electrochemical cell having an anode can and a cathode can, wherein said anode can has an open end and opposing closed end and integral side wall therebetween with an insulator seal material covering a portion of said anode can side wall; wherein the intersection of said anode can side wall and said anode can closed end forms an integral corner edge; wherein said cathode can has an open end and opposing closed end and integral side wall therebetween, said method comprising:

a) pushing the cathode can onto the anode can so that the side wall of the cathode can overlaps at least a portion of the insulator seal material to form an intermediate cell, b) punching said intermediate cell into a die cavity by applying a force against a portion of the corner edge of the closed end of the anode can without applying a force to the central portion of the closed end of said anode can while applying an opposing greater force against the closed end of the cathode can thereby forcing the cell into said die cavity; wherein the edge of the cathode can at the open end thereof is crimped over a portion of the anode can side wall with said insulator seal therebetween.

9. The method of claim 8 wherein said corner edge of the anode can has a convex surface and said force is applied to at least a portion of said convex surface.

10. The method of claim 8 wherein the cathode can side wall and anode can closed end each has a wall thickness of between about 2.0 and 5 mils (0.0508 and 0.127 mm) after step (b).

11. The method of claim 8 wherein the cathode can side wall and anode can closed end each has a wall thickness of between about 2 and 4 mils (0.0508 and 0.102 mm) after step (b).

12. The method of claim 8 wherein the cathode can side wall and anode can closed end each has a wall thickness of between about 2.0 and 3.0 mil (0.0508 and 0.0762) after step (b).

13. The method of claim 8 wherein the anode can is of triclad material comprising stainless steel having a layer of nickel on its outside surface and a layer of copper on its inside surface.

14. The method of claim 10 wherein the anode can has an integrally folded side wall forming a double side wall, wherein each of said double walls has a thickness of between about 2 and 5 mil (0.0508 and 0.127 mm).

15. The method of claim 11 wherein the anode can has an integrally folded side wall forming a double side wall, wherein each of said double walls has a thickness of between about 2 and 4 mils (0.0508 and 0.102 mm).

16. The method of claim 12 wherein the anode can has an integrally folded side wall forming a double side wall, wherein each of said double walls has thickness of between about 2.0 and 3.0 mil (0.0508 and 0.0762).

17. The method of claim 8 wherein an annular punch is used in step (a) to apply force to the corner edge of the closed end of said anode can without impacting the central portion of said closed end.

18. The method of claim 17 wherein said corner edge of the closed end of said anode can has a convex surface and said annular punch is applied to said convex surface without impacting the central portion of said closed end.

19. The method of claim 8 wherein the outside diameter of said cell is reduced by at least about 0.5 mil (0.0127 mm) in step (b) as the intermediate cell is punched into said die cavity.

20. The method of claim 8 wherein the cell is a button cell having disk-like cylindrical shape having a diameter between about 4 and 16 mm and a height between about 2 and 9 mm.

21. The method of claim 8 wherein the cell is a button cell having disk-like cylindrical shape having a diameter between about 4 and 12 mm and a height between about 2 and 6 mm.

22. The method of claim 8 wherein the cell is a zinc/air depolarized cell comprising anode material comprising zinc and alkaline electrolyte within said anode can, and a catalytic cathode material comprising manganese dioxide within said cathode can.

23. A method of assembling an electrochemical cell having an anode can and a cathode can, wherein said anode can has an open end and opposing closed end and integral side wall therebetween with an insulator seal material covering a portion of said anode can side wall; wherein the intersection of said anode can side wall and said anode can closed end forms an integral corner edge; wherein said cathode can has an open end and opposing closed end and integral side wall therebetween, said method comprising:

a) pushing the cathode can onto the anode can so that the side wall of the cathode can overlaps at least a portion of the insulator seal material to form an intermediate cell, b) punching said intermediate cell into a die cavity by applying a force against a portion of the corner edge of the closed end of the anode can without applying a force to the central portion of the closed end of said anode can while applying an opposing greater force against the closed end of the cathode can thereby forcing the cell into said die cavity; wherein the edge of the cathode can at the open end thereof is crimped over a portion of the anode can side wall with said insulator seal therebetween; wherein said central portion of said closed end of the anode can is defined as any portion of said closed end which is within one third of the radius of said closed end as measured from the center thereof.

24. A method of assembling an electrochemical cell having an anode can and a cathode can, wherein said anode can has an open end and opposing closed end and integral side wall therebetween with an insulator seal material covering a portion of said anode can side wall; wherein the intersection of said anode can side wall and said anode can closed end forms an integral corner edge; wherein said cathode can has an open end and opposing closed end and integral side wall therebetween, said method comprising:

a) pushing the cathode can onto the anode can so that the side wall of the cathode can overlaps at least a portion of the insulator seal material to form an intermediate cell,
b) punching said intermediate cell into a die cavity by applying a force against a portion of the corner edge of the closed end of the anode can without applying a force to the central portion of the closed end of said anode can while applying an opposing greater force against the closed end of the cathode can thereby forcing the cell into said die cavity; wherein the edge of the cathode can at the open end thereof is crimped over a portion of the anode can side wall with said insulator seal therebetween; wherein said central portion of said closed end of the anode can is defined as any portion of said closed end which is within two thirds of the radius of said closed end as measured from the center thereof.

* * * * *